Jan. 22, 1957   R. D. LEASE   2,778,696
THRUST BEARING STRUCTURE
Filed Jan. 12, 1955   3 Sheets-Sheet 2

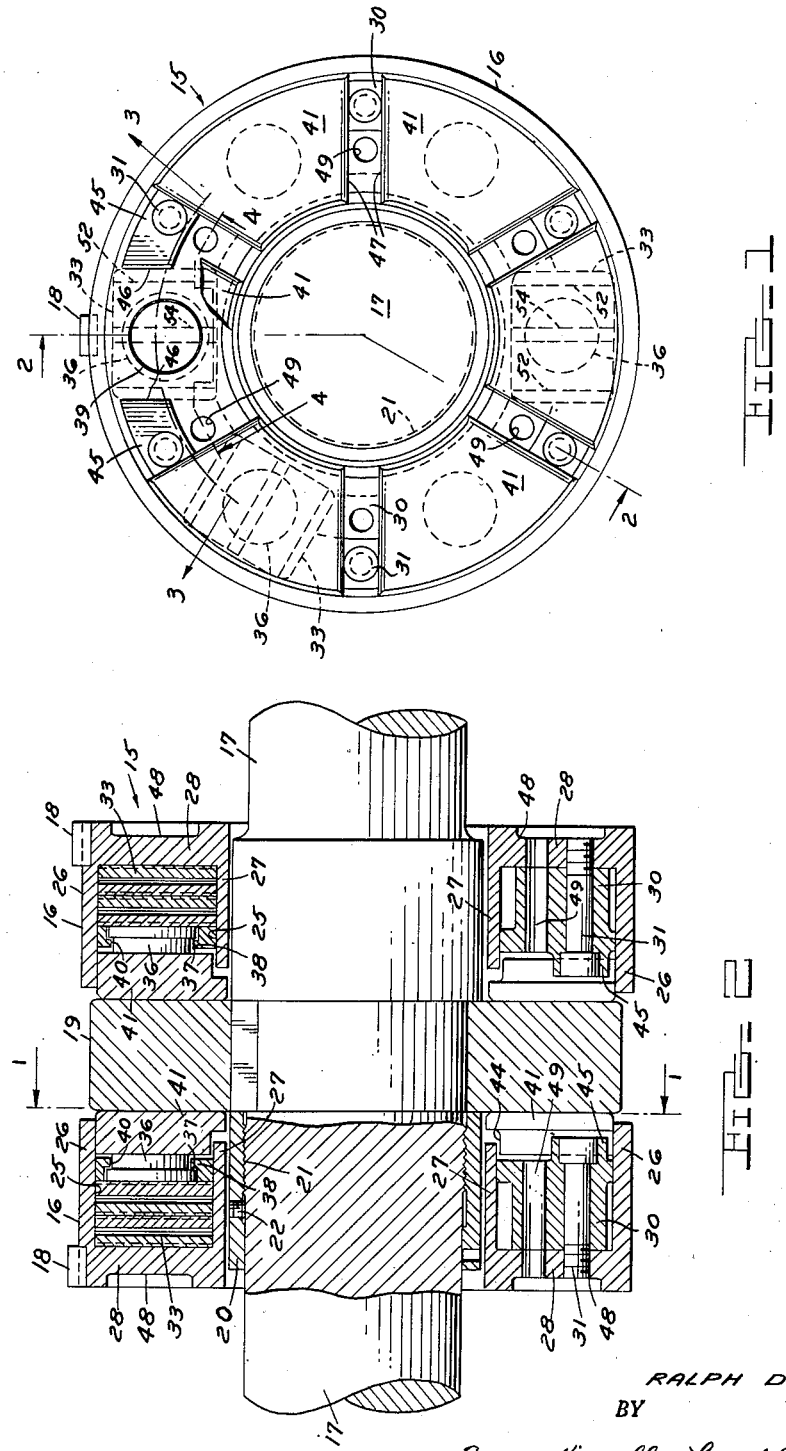

INVENTOR.
RALPH D. LEASE
BY
Barnes, Kisselle, Laughlin & Raisch
ATTORNEYS

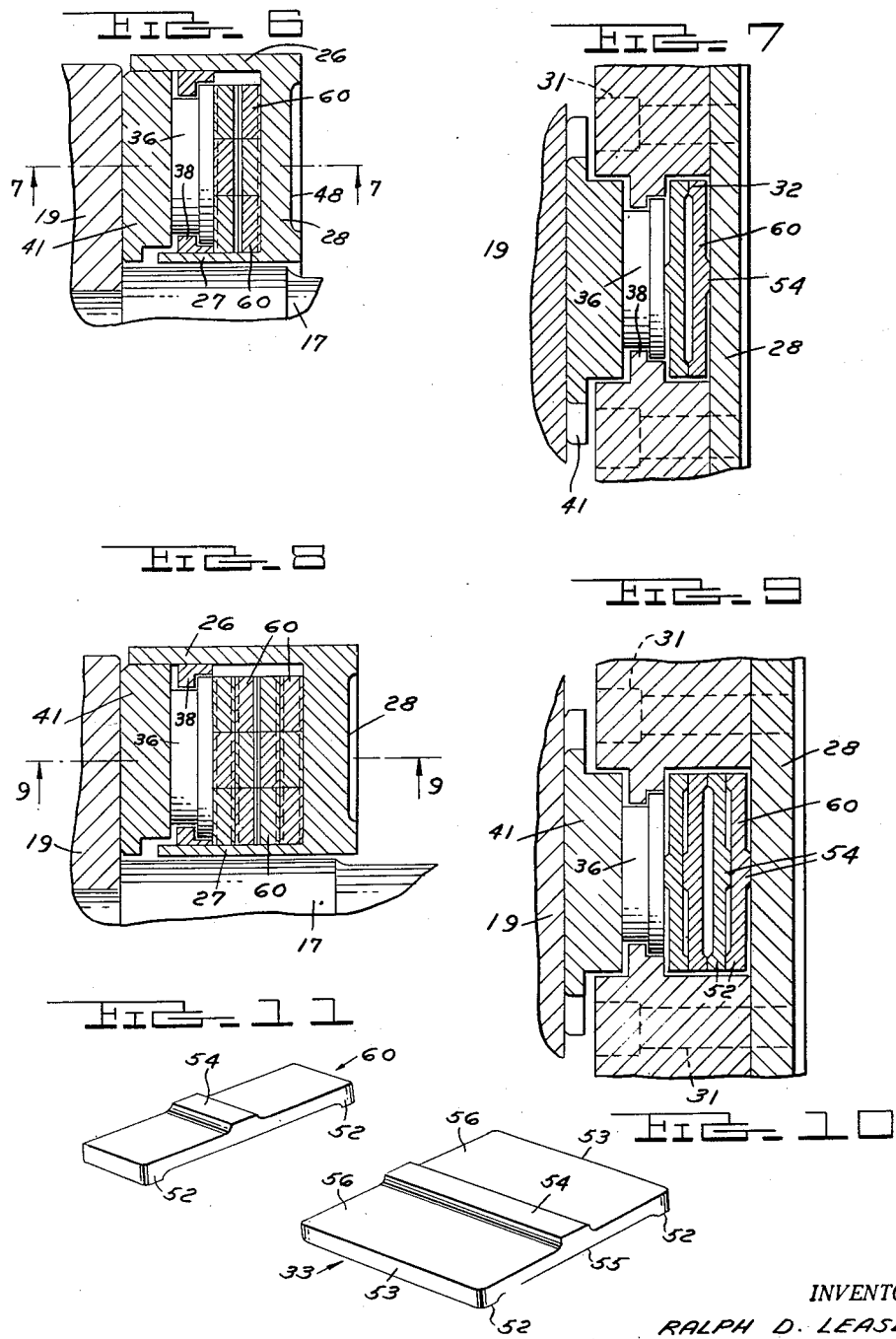

United States Patent Office 2,778,696
Patented Jan. 22, 1957

2,778,696

THRUST BEARING STRUCTURE

Ralph D. Lease, Royal Oak, Mich.

Application January 12, 1955, Serial No. 481,402

8 Claims. (Cl. 308—160)

This invention relates to bearings and particularly to thrust bearings of the type known generally as Kingsbury thrust bearings.

In the Kingsbury type thrust bearing the thrust shoes are tiltably supported by leveling plates on the bearing body to facilitate the formation of an oil film between the thrust shoes and the thrust collar on a relatively rotating shaft. In some constructions the leveling plates have been supported by springs of various kinds to prevent overloading the thrust shoes, an example of this type construction being disclosed in Wallgren 2,191,901, issued February 27, 1940.

Heretofore structures of this type have been relatively complicated and costly especially in the case of relatively large bearings for industrial machinery, hydroelectric turbines and the like. One factor contributing materially to the cost of such bearings has been that the springs used, because of their size or conformation, cannot be formed of standard spring steel stock but must be made specially.

An object of this invention is to provide a simple, inexpensive, improved thrust bearing structure wherein the leveling plates of bearings having a wide range of sizes and capacities are supported by springs made from standard spring steel stock. The invention is carried out generally by utilizing flat, rectangular springs arranged to flex as simple beams responsive to thrust on the thrust shoes and adapted to be used in various numbers and combinations. One form of the invention is shown in the accompanying drawings:

Fig. 1 is in general a plan view of a bearing according to this invention with some parts broken away and parts shown in phantom to illustrate structure.

Fig. 2 is a sectional view on line 2—2 of Fig. 1.

Fig. 6 is a fragmentary sectional view illustrating another alternative arrangement of the bearing parts.

Fig. 7 is a generally sectional view on line 7—7 of Fig. 6.

Fig. 8 is a sectional view showing a third alternative arrangement of the bearing parts.

Fig. 9 is a generally sectional view on line 9—9 of Fig. 8.

Fig. 10 is a perspective view of a spring element separately from the bearing.

Fig. 11 is a perspective view of a differently shaped spring element separately from the bearing.

Figure 3:
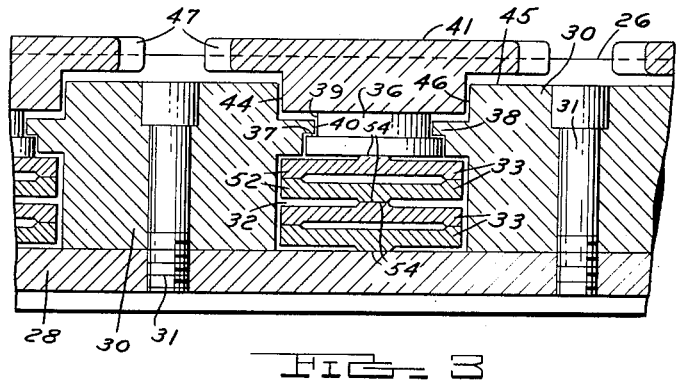
Fig. 3 is an enlarged sectional view taken generally on line 3—3 of Fig. 1.

Shown in the drawings is a thrust bearing 15 according to this invention having annular body members 16 adapted to be secured around shafting 17 rotatable relatively thereto and adapted to be secured to a machine (not shown) by such means as lugs 18. A thrust collar 19 has a sleeve portion 20 threaded onto the shafting as at 21 and fixed non-rotatably thereon by a set screw 22. Bearing 15 is illustrated as having two identical portions on opposite sides of thrust collar 19 for receiving thrust in both directions from shafting 17.

Each body member 16 has an annular chamber 25 defined by outer walls 26, inner walls 27 and a base ring portion 28. Each body member 16 has a number of equally spaced radially extending partition elements 30 secured within annular chamber 25 by such means as bolts 31 and dividing the annular chamber into a circumferential array of cages 32 (Figs. 3 and 4) for containing springs 33.

Figure 4:
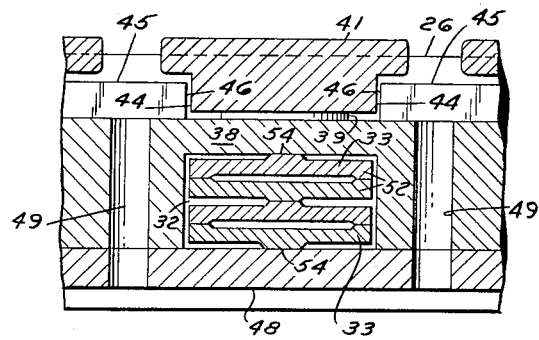
Fig. 4 is an enlarged sectional view taken generally on line 4—4 of Fig. 1.

The springs are supported by base ring 28 and in turn support leveling plates 36 which are shouldered as at 37 for engagement with a retaining ring 38 which secures springs 33 and the leveling plates within cages 32. The retaining ring is preferably formed integrally with partition elements 30 and may comprise a single circular ring or a number of segmental members. Each leveling plate 36 has a portion 39 projecting through an opening 40 (Figs. 2 and 3) in the retainer ring for supporting engagement with a thrust shoe 41 preferably having circular segmental shape as shown. A slight clearance is preferably provided between the retainer ring and leveling shoes as illustrated in Fig. 3.

Each thrust shoe 41 has an axial projection or lug 44 which engages against the radially outer and inner walls 26 and 27 of body members 16 and the radially outer portion 45 of each body member projects axially to provide shoulders 46 for engaging the sides of lugs 44, thereby securing the thrust shoes in their proper positions relatively to leveling plates 36. The thrust shoes are preferably centered on the leveling plates and while the device in the drawings is shown as having six groups of springs, leveling plates and thrust shoes, any number may be used according to the nature of the bearing involved. The radially extending edges 47 of the thrust shoes are preferably curved or beveled to facilitate formation of an oil film on the surfaces of the thrust shoes during operation.

The bearing may be operated in an oil bath. The exterior portions of base rings 28 are preferably recessed as at 48 (Fig. 2) to form, together with an adjacent part of the machine (not shown) in which the bearing is mounted, a continuous annular oil chamber. Each partition element 30 is preferably provided with an axial passageway 49 having one end opening into chamber 48 and its other end opening adjacent the thrust shoes. The purpose of this arrangement appears below.

Springs 33 fit non-rotatably within chambers 32 and for this purpose both the springs and chambers may be shaped rectangularly as shown. As best shown in Fig. 10, each spring has flat, plate-like form with spaced apart lands 52 projecting from one face and extending from edge to edge preferably adjacent the ends 53 thereof. Each spring preferably has another land 54 projecting from its other face and disposed between lands 52. Land 54 extends preferably from edge to edge of the spring and lands 52 and 54 are preferably parallel.

Springs 33 are made of standard rolled spring steel stock with lands 52 and 54 extending transversely to the grain of the rolled metal. The spring can conveniently be made by grinding a groove 55 in one face of the stock to provide lands 52 and grinding away the end portions 56 of the other face to provide land 54.

In the arrangement shown in Figs. 1 through 4 a single stack of four springs 33 is nested within each cage 32 with lands 54 of the outer springs engaging base ring 28 and leveling plates 36, with lands 52 of adjacent pairs of springs interengaging and with the central lands 54 of the two inner springs interengaged. The springs are preferably in substantially unstressed condition.

In operation, it may be assumed that the bearing is mounted in a machine and around shafting 17 with base rings 28 abutting adjacent portions of the machine, not shown. Thrust collar 19 is engaged against thrust shoes 41 and the bearing is operating in an oil bath. As the shafting and thrust collar rotate relatively to the bearing, an oil film is formed between the thrust collar and the generally flat surfaces of the thrust shoes. The thrust shoes tilt slightly to form the oil film as is well known in the art and this tilting is facilitated by the clearance between the shoes and shoulders 46 and the clearance between leveling plates 36 and retainer ring 38.

Axial thrust on shafting 17 is transmitted through thrust collar 19 to the thrust shoes and thence to springs 33 through leveling plates 36. Each spring 33 is loaded at its central region through its central land 54. The marginal or end lands 52 of each spring cooperate with its central portion to form a beam so that each of the springs deflects as a simple beam responsive to thrust thereon. The various stacks or groups of springs may deflect by different amounts when uneven loads are imposed upon their respective thrust shoes.

Leveling plates 36 trap oil within cages 32 to provide a series of dash pots for dampening undue oscillation of the springs or spring groups. The bearing is arranged symmetrically with respect to the center of shafting 17 to operate effectively regardless of the direction of rotation of the shafting relatively to the bearing.

Each spring has substantially uniform strength throughout its extent because of its generally flat, plate-like form and because substantially all of the deflection of the beam is transverse to the rolled grain in the metal thereof. The strength of the springs may be varied for use in bearings of different sizes and capacities by varying the thickness and width of the springs. The capacity of the bearing may be further increased or varied by varying the numbers of springs in each cage 32.

Figure 5:
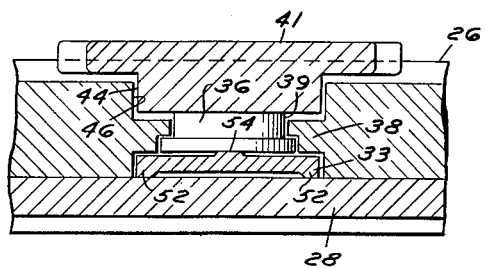
Fig. 5 is a fragmentary sectional view showing an alternative arrangement of the parts of the bearing.

Thus, a single spring 33 may be disposed in each cage 32 for relatively small bearings as shown in Fig. 5 or a larger number of springs may be grouped in each cage in larger bearings. Figs. 6 and 7 illustrate an arrangement wherein each spring group comprises three two-spring stacks in side by side relation supporting the leveling plate 36 and Figs. 8 and 9 show spring groups having four springs in each of three stacks. Figs. 6 through 9 illustrate the use of springs 60 having somewhat different shape from springs 33. Spring 60 is illustrated separately in Fig. 11.

The strength of the spring groups may be varied by altering the arrangement of springs within each group. For example, where two or more adjacent springs have their central lands 54 and marginal lands 52 projecting in the same direction as illustrated in Fig. 9, they will act as a composite beam and a stiffer spring group will result than where adjacent springs have their respective lands projecting in opposite directions as in Fig. 3. The total amount of deflection of the springs or spring groups may be varied according to the number, arrangement and shape of the individual springs.

Thus it is seen that the invention provides a thrust bearing structure wherein the leveling plates are supported by relatively inexpensive springs made from standard spring steel stock. The structure can be adapted for use in a wide range of applications, including relatively small machines and very large installations such as hydroelectric machinery, by merely varying the number and arrangement of relatively small spring elements within circumferentially arranged cages of suitable size. The structure is relatively inexpensive since standard spring steel stock is used without the necessity for any special forging, rolling, tempering, etc., and since the springs are merely nested within cages formed by a relatively simple body and retainer ring.

I claim:

1. A thrust bearing comprising, an annular body adapted to be mounted around a shaft, means forming a circumferential array of cages on said body, said cages having generally rectangular shape, a plurality of spring elements having generally rectangular shape and fitting non-rotatably in said cages, said spring elements having generally flat plate-like form with means forming spaced apart generally straight parallel lands on one face, leveling plate means supported by said spring elements at locations intermediate said lands, and thrust shoe means for receiving thrust from a shaft around which said bearing is adapted to be mounted, said thrust shoe means being supported by said leveling plate means, whereby said spring elements deflect as beams responsive to thrust on said shoe means.

2. A thrust bearing comprising, an annular body adapted to be mounted around a shaft, means forming a circumferential array of cages on said body, said cages having generally rectangular shape, a plurality of spring elements having generally rectangular shape and fitting non-rotatably in said cages, each spring element having generally flat, imperforate plate-like form with a generally centrally disposed first land on one face and a second land adjacent each end of its other face, said lands being generally parallel and extending along generally straight lines transversely of said spring element, leveling plate means engaging said first lands with said second lands and intermediate portions forming beams supporting said leveling plate means, and thrust shoe means for receiving thrust from a shaft around which said bearing is adapted to be mounted, said thrust shoe means being supported by said leveling plate means, whereby said spring elements deflect as beams responsive to thrust on said shoe means.

3. The thrust bearing defined in claim 2 wherein there are a plurality of spring elements in each of said cages, said spring elements being arranged in side by side relation.

4. The thrust bearing defined in claim 2 wherein there are a plurality of spring elements in each of said cages, said spring elements being arranged in a plurality of adjacent stacks.

5. A thrust bearing comprising, shafting adapted to be rotatably mounted on a machine, an annular body around said shafting, said body being adapted to be secured to a machine on which said shafting is mounted, said body having a radially extending base ring with outer and inner axial walls defining an annular chamber, said body including a retainer ring, said retainer ring having radially extending partition elements, means securing said retainer ring to said base ring with said partition elements forming an annular array of cages in said chamber, said cages having substantially rectangular form, a plurality of substantially rectangular, generally flat imperforate spring elements nesting non-rotatably in said cages, said spring elements being supported by said base ring, each of said spring elements having generally straight, spaced-apart, parallel lands on one face, leveling plate means supported by said spring elements at locations intermediate said lands, said retainer ring securing said leveling plate means into supported relation on said spring elements, a plurality of thrust shoes supported by said leveling plate means, means forming a thrust collar on said shafting, said thrust collar bearing rotatably on said thrust shoes, so that said spring elements flex as simple beams responsively to thrust on said shoes.

6. The combination defined in claim 5 wherein said base ring is recessed exteriorly of said chamber to form an annular oil chamber when mounted on a machine on which said bearing is adapted to be used, said partition means having axial passageway means opening into said recess and opening adjacent said thrust shoes whereby to form dash-pot means for dampening oscillation of said spring elements.

7. A thrust bearing comprising, a body, means forming a plurality of adjacent cages on said body, said cages having generally rectilinear interior shape, a plurality of spring elements, each spring element having generally rectilinear imperforate form, each spring element having integral, generally straight, spaced-apart, parallel lands on one face, said spring elements fitting non-rotatably in said cages, leveling plate means supported by said spring elements at portions intermediate said lands, and thrust shoe means adapted to receive thrust from an element on a machine on which said bearing is adapted to be used, said thrust shoe means being supported by said leveling plate means, whereby said spring elements deflected as simple beams responsively to thrust on said thrust shoe means.

8. A thrust bearing comprising, a shaft adapted to be rotatably mounted on a machine, an annular body around said shaft adapted to be secured on such machine, means forming a generally circular array of cages on said body, said cages having generally rectangular shape, a plurality of imperforate, generally rectangular spring elements fitting non-rotatably in said cages, said spring elements being formed of cold rolled steel, said spring elements having spaced-apart, generally straight, parallel integral lands on one face, said lands extending in a direction transversely to the direction in which the steel of said spring elements was rolled, leveling plate means supported by said spring elements at portions intermediate said lands, thrust shoe means supported by said leveling plate means, means forming a thrust collar on said shaft, said thrust collar bearing rotatably on said thrust shoe means, whereby said spring elements deflect as simple beams responsively to thrust on said thrust shoe means.

References Cited in the file of this patent

UNITED STATES PATENTS

| | | |
|---|---|---|
| Re. 4,959 | Allyn | July 2, 1872 |
| 1,754,324 | Kingsbury | Apr. 15, 1930 |
| 2,191,901 | Wallgren | Feb. 27, 1940 |